United States Patent [19]
Gotoh et al.

[11] Patent Number: 5,223,556
[45] Date of Patent: Jun. 29, 1993

[54] AROMATIC POLYETHERKETONE RESIN COMPOSITIONS CONTAINING POLYETHERIMIDE, POLYSULFONE-COATED CARBON FIBERS AND MECHANICAL COMPONENT FORMED THEREFROM

[75] Inventors: Yoshihisa Gotoh; Toshihiko Tsutsumi; Toshiaki Takahashi; Takatoshi Sagawa, all of Kanagawa, Japan

[73] Assignees: Mitsui Toatsu Chemicals, Incorporated, Tokyo; Nissan Motor Co., Ltd., Kanagawa, both of Japan

[21] Appl. No.: 948,413

[22] Filed: Sep. 22, 1992

Related U.S. Application Data

[63] Continuation of Ser. No. 506,154, Apr. 9, 1990, abandoned.

[30] Foreign Application Priority Data

Apr. 12, 1989 [JP] Japan .................. 1-090828
Apr. 12, 1989 [JP] Japan .................. 1-090829
Apr. 12, 1989 [JP] Japan .................. 1-090830

[51] Int. Cl.⁵ .............................................. C08K 9/00
[52] U.S. Cl. ................................. 523/215; 523/205; 524/538; 525/420; 525/436
[58] Field of Search .............. 523/205, 215; 524/538; 525/420, 436

[56] References Cited

U.S. PATENT DOCUMENTS

| | | | |
|---|---|---|---|
| 3,785,916 | 1/1974 | Turton et al. | 161/156 |
| 3,798,105 | 3/1974 | Hannah et al. | 156/307 |
| 4,049,613 | 9/1977 | White | 260/37 N |
| 4,664,768 | 5/1987 | Scala et al. | 204/181.6 |
| 4,764,427 | 8/1988 | Hara et al. | 428/400 |
| 4,777,204 | 10/1988 | Ikenaga et al. | 524/439 |
| 4,783,349 | 11/1988 | Cogswell et al. | 427/407.3 |

FOREIGN PATENT DOCUMENTS

| | | |
|---|---|---|
| 56-90837 | 7/1981 | Japan . |
| 56-120730 | 9/1981 | Japan . |
| 62-115033 | 5/1987 | Japan . |
| 62-119268 | 5/1987 | Japan . |

*Primary Examiner*—Paul R. Michl
*Assistant Examiner*—U. K. Rajguru
*Attorney, Agent, or Firm*—Burns, Doane, Swecker & Mathis

[57] ABSTRACT

Resin compositions having excellent mechanical strength, especially at high temperatures are disclosed. The resin compositions comprise 95-60 wt. % of an aromatic polyetherketone having recurring units represented by the following formula:

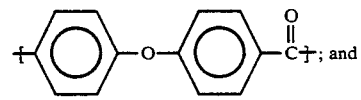

and 5-40 wt. % of a polyetherimide having recurring units represented by the following formula:

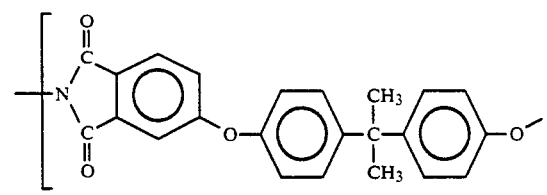

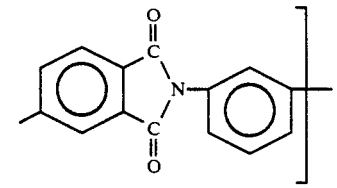

Also disclosed are fiber-reinforced resins, which comprise 75-55 wt. % of one of the above compositions and 25-45 wt. % of carbon fibers obtained by coating starting carbon fibers with an aromatic polysulfone resin and then heating the thus-coated carbon fibers at 300°-400° C., and mechanical components made of desired one of the fiber-reinforced resins which are suitable for use in internal combustion engines or auxiliary equipment.

10 Claims, 3 Drawing Sheets

AROMATIC POLYETHERKETONE RESIN COMPOSITIONS CONTAINING POLYETHERIMIDE, POLYSULFONE-COATED CARBON FIBERS AND MECHANICAL COMPONENT FORMED THEREFROM

This application is a continuation of application Ser. No. 07/506,154, filed Apr. 9, 1990, now abandoned.

BACKGROUND OF THE INVENTION

1.) Field of the Invention

The present invention relates to aromatic polyetherketone resin compositions having excellent heat resistance, fiber-reinforced resin compositions obtained by adding carbon fibers to the resin compositions, and mechanical components made of the fiber-reinforced resin compositions and suitable for use in internal combustion engines or auxiliary equipment, especially impellers for centrifugal compressors, power transmitting gears, and the like.

2.) Description of the Related Art

Aromatic polyetherketone resins are expected to find utility in electric and electronic equipment, machinery, automobiles and the like, because they are engineering plastics excellent in mechanical, chemical and thermal properties.

With the recent advances of technology, there is an increasing demand for materials having, at enhanced levels, the characteristics of aromatic polyetherketone resins, especially their heat resistance. It has hence been the practice that a fibrous reinforcing material such as glass fibers or carbon fibers is incorporated in aromatic polyetherketone resins to improve both mechanical strength and heat resistance.

The above conventional practice is however accompanied by the drawback that the mechanical strength at high temperatures can be improved but the reduction of strength in a temperature range around the glass transition temperature of the matrix remains unimproved.

The following problems also arise when carbon fibers are incorporated as a reinforcing material in aromatic polyetherketone resins.

Carbon fibers are widely employed to reinforce plastic materials whose matrix resins are epoxy resins. Epoxy resins are therefore used as binders for carbon fibers. Such epoxy resin binders are effective where thermosetting resins such as epoxy resins are used as matrix resins, but have poor adhesion to thermoplastic resins such as aromatic polyetherketone resins so that the epoxy resin binders cannot provide resin compositions having good mechanical strength. It has hence been attempted to use polyamide resins as binders for thermoplastic resins as disclosed in Japanese Patent Application Laid-Open No. 106752/1978. A high temperature of at least 370° C. is however required to mold or otherwise form aromatic polyetherketone resins. When carbon fibers bound with an epoxy resin or polyamide resin are used, the binder may undergo thermal decomposition during the molding, thereby causing problems such as the formation of voids and strength reduction at welded portions.

On the other hand, Japanese Patent Application Laid-Open No. 120730/1981 discloses the use of carbon fibers bound with an aromatic polysulfone resin. The aromatic polysulfone resin is said to overcome the problems such as the formation of voids and strength reduction at welded portions. The improvement in mechanical strength is however small, so that there is an outstanding demand for a still greater improvement in mechanical strength. Further, in an aromatic polyetherketone resin composition containing carbon fibers bound with an aromatic polysulfone resin, the aromatic polysulfone resin is present at the interfaces between the carbon fibers and the aromatic polyetherketone resin. It has therefore been pointed out that the mechanical strength of this resin composition is lowered when it is dipped in a chemical solution which attacks the aromatic polysulfone resin.

The mechanical strength of the aromatic polyetherketone resin can be improved by the incorporation of carbon fibers. This method is however accompanied by the drawback that its strength reduction in the temperature range above the glass transition temperature of the matrix cannot be improved.

Exemplary conventional impellers made of a fiber-reinforced resin include those disclosed in Japanese Patent Publication No. 48684/1977 and Japanese Patent Application Laid-Open Nos. 135132/1982, 119105/1982, 18296/1984 and 283797/1986. The resin materials which make up these impellers feature the use of carbon fibers as a reinforcing material for the resins. In particular, Japanese Patent Application Laid-Open No. 119105/1982 discloses that carbon-fiber-reinforced resins comprising heat-resistant thermoplastic resins or thermo-setting resins as matrix resins can be used in impellers.

The impeller of a centrifugal compressor is however used under such conditions that the temperature ranges from $-50°$ C. to $200°$ C. (maximum temperature during ordinary application: $165°$ C.) and the maximum revolution speed reaches as high as $13 \times 10^4$ rpm. Moreover, the stress which occurs when driven at the highest revolution speed reaches about $20 \ kg/mm^2$ in the case of impellers currently used (material: aluminum alloy, outer diameter: about 60 mm). The stress reaches as great as about $10 \ kg/mm^2$ even at the basal part of each blade. The maximum stress at the time of revolution can be reduced about one half or so by using a fiber-reinforced resin whose specific gravity is low. When a material is chosen in view of the currently used conditions while taking into parallel consideration heat resistance, strength (tensile, flexural and compression), modulus of elasticity (tensile and flexural), durability, fatigue resistance (tensile and flexural), and creep characteristics, the thermoplastic resins and thermosetting resins disclosed in Japanese Patent Application Laid-Open No. 119105/1982 can by no means be used as they are.

As fiber-reinforced resin compositions capable of satisfying these conditions, compositions of heat resistant resins—such as polyethersulfones (PES), polyetherimides (PEI), polyetheretherketones (PEEK), polyetherketones (PEK), polyetherketoneketones (PEKK), polyketonesulfides (PKS), polyaryletherketones (PAEK), aromatic polyamides (PA), polyamideimides (PAI), or polyimides (PI)—with carbon fibers, glass fibers, whiskers or the like appear to be promising.

The above-described resins however have a high melting point. It is therefore necessary to mold them by raising the resin-melting temperature to a relatively high temperature of from $350°$ C. to $430°$ C. Resin-reinforcing carbon fibers presently available on the market primarily use, as a binder, a polyamide resin (decomposition temperature: $280°$ C.) for thermoplastic resins or an epoxy resin (decomposition temperature: $300°$ C.) for thermosetting resins. These binders however involve various problems. Namely, they are susceptible to decomposition at the above-described resin-melting temperature (350° C.–430° C.) upon molding. Due to insufficient wetting of carbon fibers with the matrix resins, the interfacial strength tends to decrease and also to become uneven. When employed as materials for fiber-reinforced-resin-made impellers of centrifugal compressors, they cannot effectively use the reinforcing effect of carbon fibers and have low strength. Further, matrix resins which can exhibit maximum wetting property to carbon fibers when combined with the latter involve the problems that they have a low glass transition temperature and their stiffness is insufficient when used at the maximum temperature of 165° C. which are encountered in the course of ordinary use.

SUMMARY OF THE INVENTION

An object of the present invention is to provide an aromatic polyetherketone resin composition significantly improved in mechanical strength at high temperatures while retaining the inherent excellent chemical properties of polyetherketones.

Another object of the present invention is to improve the heat resistance of a matrix resin itself and hence to provide a carbon-fiber-incorporated aromatic polyetherketone resin composition having excellent mechanical strength at high temperatures.

A further object of the present invention is to provide a mechanical component for an internal combustion engine or auxiliary equipment, which mechanical component is formed of a fiber-reinforced resin, has high heat resistance and undergoes only a small reduction at strength and stiffness even in a high temperature range.

In one aspect of the present invention, there is thus provided a resin composition comprising:

95–60 wt. % of an aromatic polyetherketone having recurring units represented by the following formula (1):

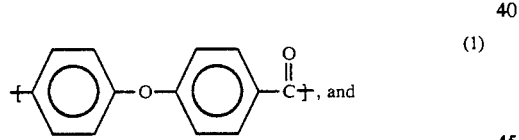

5–40 wt. % of a polyetherimide having recurring units represented by the following formula (2):

In another aspect of the present invention, there is also provided a fiber-reinforced aromatic polyetherketone resin composition comprising:

(a) 75–55 wt. % of a resin composition comprising 95–70 wt. % of an aromatic polyetherketone having recurring units represented by formula (1) and 5–30 wt. % of a polyetherimide having recurring units represented by formula (2); and (b) 25–45 wt. % of carbon fibers obtained by coating starting carbon fibers at surfaces thereof with an aromatic polysulfone resin and then heating the thus-coated carbon fibers at 300°–400° C.

In a further aspect of the present invention, there is also provided a mechanical component for an internal combustion engine or auxiliary equipment, said mechanical component being formed of the fiber-reinforced resin composition.

DESCRIPTION OF THE PREFERRED EMBODIMENTS

Figure 1:
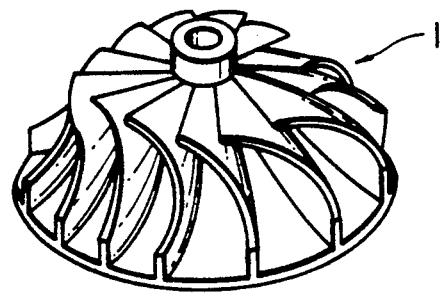
FIG. 1 is a perspective view of an impeller according to one embodiment of the present invention.

The aromatic polyetherketone useful in the practice of the present invention is a thermoplastic crystalline resin having recurring units represented by the following formula (1):

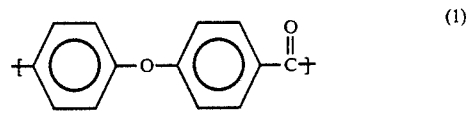

In the present invention, the melt flow index of the polyetherketone as measured at 380° C. under a load of 2.16 kg in accordance with ASTM D1238 is desirably in a range of 5–50 g/10 min, more desirably in a range of 10–25/10 min. Commercially-available examples include "Victrex Polyetherketone PEK 220P" (trade name; product of Imperial Chemical Industries Limited, England).

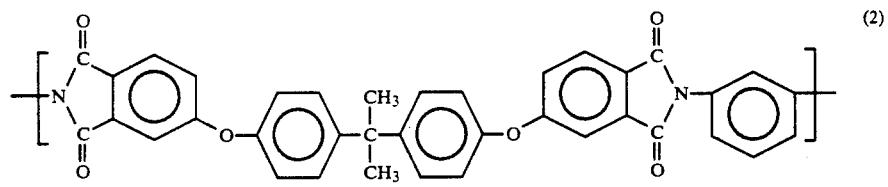

The polyetherimide usable in the present invention has recurring units represented by the following formula:

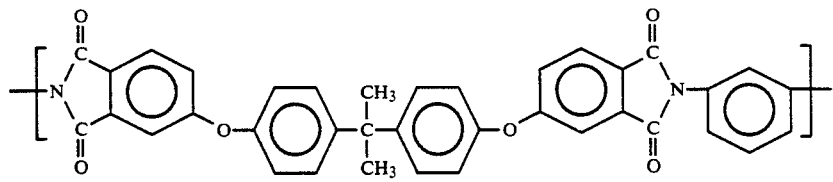

(2)

As a commercial product, "Ultem" (trade mark; product of General Electric Company, U.S.A.) is widely known. The polyetherimide can be easily produced by the process disclosed, for example, in Japanese Patent Application Laid-Open No. 826/1981. In the present invention, the melt flow index of the polyetherimide as measured at 320° C. under a load of 2.16 kg in accordance with ASTM D1238 is desirably in a range of 0.3–5 g/10 min, more desirably in a range of 0.5–3 g/10 min.

Regarding the mixing ratio of the aromatic polyetherketone to the polyetherimide, it is suitable to use the aromatic polyetherketone in a proportion of 95–60 wt. %, and when used in a fiber-reinforced resin, in a proportion of 95–70 wt. %, desirably 90–70 wt. %; and the polyetherimide in an proportion of 5–40 wt. %, and when employed in the fiber-reinforced resin, in a proportion of 5–30 wt. %, desirably 10–30 wt. %. If the proportion of the aromatic polyetherketone exceeds 95 wt. % and that of the polyetherimide is less than 5 wt. %, the intended effects for the improvement of the mechanical strength at high temperatures cannot be fully brought about for the resulting resin composition. When the proportion of the aromatic polyetherketone is smaller than 60 wt. % and that of the polyetherimide is in excess of 40 wt. %, the resulting resin composition can no longer exhibit the excellent chemical properties which the aromatic polyetherketone has. It is desired that the aromatic polyetherketone and polyetherimide are uniformly mixed in the resin composition according to the present invention. No particular limitation is imposed on the mixing method, and various methods can be used. For example, they can be separately charged into a melt extruder and can then be mixed there. They can be pre-blended beforehand in a mixer such as a Henschel mixer, ribbon blender or tumbler and can then be charged into a melt extruder.

The resin composition of the present invention, which comprises the aromatic polyetherketone and polyetherimide described above, has been significantly improved in mechanical strength at high temperatures while retaining the inherent excellent chemical properties of the polyetherketone.

A description will next be made of the fiber-reinforced resin composition according to the present invention.

The aromatic polysulfone resin employed as a binder to coat surfaces of carbon fibers in the present invention is a linear polymer having arylene bonds, ether bonds and sulfone bonds as bonding units. For example, those having structural units as shown by the following formulae respectively are known:

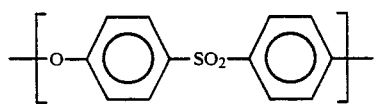

(3)

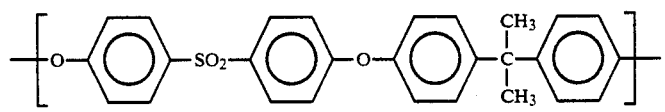

(4)

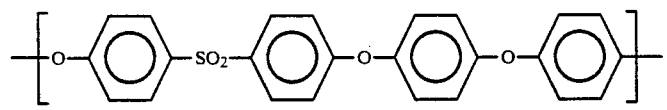

(5)

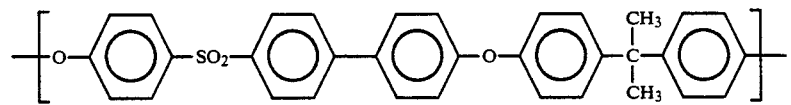

(6)

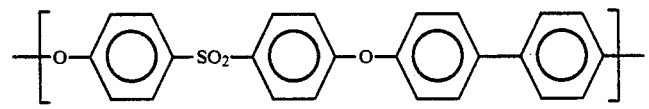

(7)

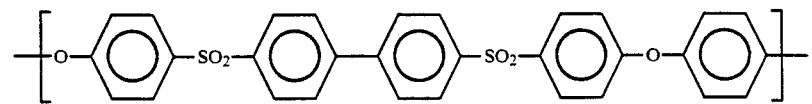

(8)

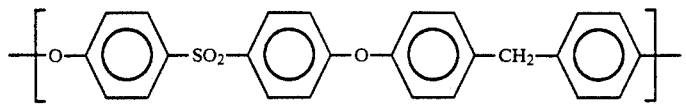

(9)

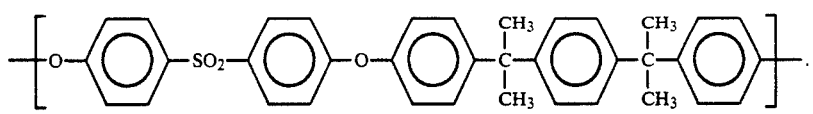

(10)

These aromatic polysulfone resins can be produced, for example, by the process described in Japanese Patent Publication No. 10067/1965, 7799/1967 or 617/1966. At least one of the aromatic polysulfone resins is used. Two or more of the aromatic polysulfone resins can also be used as a mixture. As products available on the market, "Victrex polyethersulfone" (trade name; product of Imperial Chemical Industries Limited, England) can be mentioned as a representative example of polysulfone resins represented by the formula (3) and "Udel Polysulfone" (trade name; product of Amoco Chemicals Corporation, U.S.A.) can be mentioned as a typical example of polysulfone resins represented by the formula (4).

Carbon fibers usable in the present invention include acrylic carbon fibers, rayon carbon fibers, lignin carbon fibers, pitch carbon fibers, etc. They are all usable in the present invention. Acrylic carbon fibers are preferred for use in the present invention because of their highest tenacity. Carbon fibers may be in any form, for example, in the form of chopped strands, rovings, textile or the like. It is more preferred to subject these carbon fibers to surface oxidation in advance. These carbon fibers can be coated with the aromatic polysulfone resin in the following manner. Carbon fibers are dipped in a solution of the aromatic polysulfone resin in a solvent such as dichloromethane, chloroform, 1,2-dichloroethane, 1,1,2,2-tetrachloroethane, dimethyl sulfoxide, normal methylpentane methyl ethyl ketone or 1,1,2-trichloroethane. The carbon fibers thus dipped are then dried to remove the solvent, thereby obtaining carbon fibers coated with the aromatic polysulfone resin.

In general, the preferred coat weight of the aromatic polysulfone resin to carbon fibers may be 0.1-10 14 parts by weight per 100 parts by weight of the carbon fibers. Coat weights smaller than 0.1 part by weight tend to be too small to bring about the effects of the invention. Coat weights greater than 10 parts by weight are feasible but meaningless, because no additional improvement can be expected to the mechanical strength.

Heat treatment of the carbon fibers coated with the aromatic polysulfone resin as described above is conducted by exposing them to a temperature of 300°–400° C., most preferably 340°–380° C. in air. The heating time is desirably 3–20 hours, with 5–15 hours being particularly preferred.

Various methods may be used to mix the thus-obtained carbon fibers, which are coated with the aromatic polysulfone resin, with the resin composition of the aromatic polyetherketone and polyetherimide. For example, the mixing can be achieved by chopping the carbon fibers, which have been coated and then heat-treated, 3-6 mm by 3-6 mm, feeding the thus-chopped carbon fibers and the resin composition of the aromatic polyetherketone and polyetherimide separately into a melt extruder and then mixing them together. As an alternative, they may be pre-blended beforehand in a mixer such as a Henschel mixer, super mixer or ribbon blender and then fed to a melt extruder. As a further alternative, it is also possible to feed carbon fiber rovings, which have been coated and heat-treated, directly to a melt extruder to mix them with the resin composition of the aromatic polyetherketone and polyetherimide. Namely, no limitation is imposed on the order and manner of the mixing of the three components of carbon fibers, polyetherketone and polyetherimide as long as the proportions of the present invention can be achieved eventually.

Regarding the mixing ratio of the carbon fibers, which have been coated with the resin composition of the aromatic polyetherketone and polyetherimide in the present invention, 25-45 wt. % of the carbon fibers are mixed with 75-55 wt. % of the composition of the aromatic polyetherketone and polyetherimide. Amounts of carbon fibers smaller than 25 wt. % result in resin compositions having low mechanical strength and are hence not preferred. When carbon fibers are mixed in an amount greater than 45 wt. %, the resulting resin composition can hardly be melted and mixed into a uniform mixture and moreover has substantially reduced melt flowability. As a consequence, the resulting resin composition shows impaired moldability, for example, upon injection molding.

In the aforementioned carbon-fiber-incorporated resin compositions of the present invention, the high-temperature heat resistance of the matrix resins has been improved. Owing to the synergy between their improved heat resistance and the reinforcing effect of the carbon fibers, the carbon-fiber-incorporated resin compositions exhibit excellent heat resistance over a wide range of temperatures.

The resin compositions and fiber-reinforced resin compositions of the present invention may be added, if needed, with a filler such as talc, calcium carbonate, mica or glass beads, a fibrous reinforcing material such as glass fibers, potassium titanate fibers, aramid fibers or ceramic fibers, a stabilizer and a colorant to extent not impairing their quality and performance.

The resin compositions and fiber-reinforced resin compositions of the present invention can be molded or otherwise formed into desired molded or formed articles by a known molding or forming method such as injection molding, extrusion, transfer molding, compression molding or the like.

The fiber-reinforced polyimide resin compositions of the present invention are generally furnished for injection molding in the form of pellet-like molding materials which permit easy handling. These pellets can be obtained, for example, by a known single-screw or twin-screw extruder, namely, by mixing the polyetherketone, polyetherimide and carbon fibers and then extruding the resultant mass as pellets at a cylinder temperature of 360°–420° C., preferably 370°–390° C. while controlling within a range of 2–3 the compression ratio by the screw(s) of the extruder. Injection molding can be conducted at a cylinder temperature of 360°–420° C., preferably 380°–400° C. and a mold temperature of 150°–230° C., preferably 180°–200° C., whereby impellers having a complex shape, made of a carbon-fiber reinforced resin and suited for use in centrifugal compressors, power transmitting gears, and the like can be obtained easily.

An impeller according to one embodiment of the present invention, which is suitable for use in a centrifugal compressor, will hereinafter be described with reference to some of the accompanying drawings.

Figure 2:
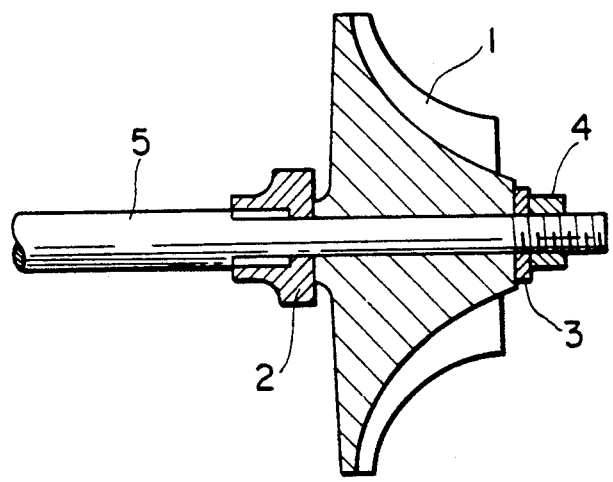
FIG. 2 is a cross-sectional view of the impeller mounted on a drive shaft.

First, the structure of the impeller will be described with reference to FIG. 1. As shown in the figure, the impeller designated generally at numeral 1 has a complex shape, and moreover requires high dimensional precision. As illustrated in FIG. 2, the impeller 1 is interposed between a sleeve 2 and a washer 3 and is fixed on a shaft 5 by a nut 4.

Figure 3:
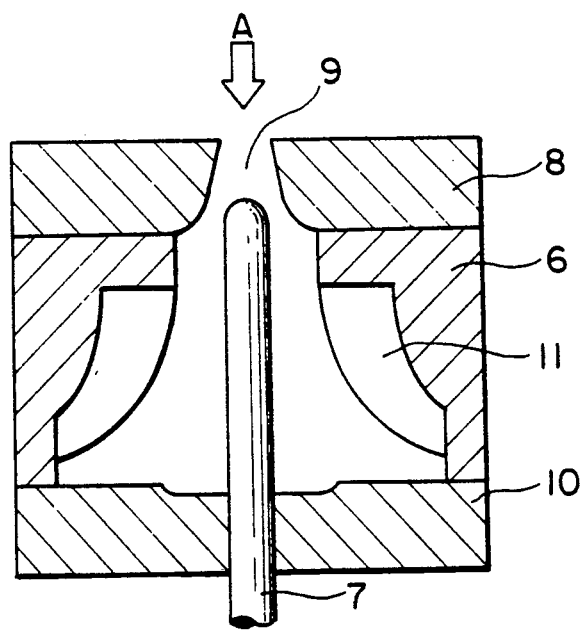
FIG. 3 is a cross-sectional view of a mold suitable for use in molding the impeller.

The impeller 1 of the present invention can be fabricated by a conventional method such as extrusion or injection molding, using one of the fiber-reinforced resin compositions described above. The impeller 1 can be molded, for example, by using the mold shown in FIG. 3. Namely, a pin 7 is attached to a bottom plate 10 which is combined with sectional mold 6 defining the shape of the impeller. A top plate 8 is then firmly fixed to the mold 6. The molding material is injected or extruded in the direction A through a gate 9, so that the molding material is filled in the impeller-shaped cavity 11 to mold the impeller.

The mechanical components of this invention, which are suitable for use in internal combustion engines or auxiliary equipment, have been improved not only in strength but also in glass transition temperature because of the improved wetting characteristics between the carbon fibers and the matrix resin in the fiber-reinforced resin employed. They therefore have high heat resistance and their strength and stiffness are reduced only a little even at a high temperature range above 165° C. Accordingly, they can remain intact even when continuously driven at a high speed. In addition to the above common advantages, mechanical components such as impellers also have the following advantages. Owing to the light weight of the impeller, the follow-up performance to variations in engine load has been improved. Further, the precision of the surfaces of the impeller has baan significantly improved compared to the corresponding impeller made of an aluminum alloy. It is therefore possible to reduce the divergence of intake air from the blade surfaces during high-speed rotation, so that the efficiency of intake and compression is improved.

EXAMPLES 1–4

"Victrex Polyetherketone PEK 220P" (trade name; product of Imperial Chemical Industries Limited, England) and "Ultem 1000" (trade name; product of General Electric Company, U.S.A.) were dry-blended as aromatic polyetherketone (PEK) and polyetherimide (PEI) in accordance with the compositions shown in Table 1, followed by extrusion at a cylinder temperature of 380° C. through an extruder having a cylinder diameter of 40 mm to obtain pellet samples.

Each of the pellet samples was then molded by a conventional injection molding machine into specimens at the cylinder temperature of 380° C. and the mold temperature of 160°–180° C. Their mechanical properties were measured.

Tensile strength and flexural strength were measured at 23° C. and 150° C. in accordance with ASTM D-638 and D-790, respectively. Heat distortion temperature was measured under a load of 18.6 kg in accordance with ASTM D-648. The results are also shown in Table 1.

As is readily understood from Table 1, the products molded from the resin compositions of the present invention have excellent mechanical properties.

COMPARATIVE EXAMPLES 1–4

Specimens were prepared and tested by similar procedures to Examples 1–4 except that the formulations of the resin compositions were changed as shown in Table 1. The results are given in Table 1.

The resin compositions of Comparative Examples 1 and 2, in which the polyetherimide was not present at all or was present in small amounts, had low mechanical strength at a high temperature of 150° C. The resin compositions of Comparative Examples 3 and 4, in which the polyetherimide was incorporated in large amounts, had somewhat higher mechanical strength at the high temperature, but their specimens were deformed when they were released from the mold after molding. This can be attributed to their low flexural strength at ambient temperature.

TABLE 1

| | Evaluation of Resin Compositions | | | | | |
|---|---|---|---|---|---|---|
| | Charged composition (wt. %) | | Thermal properties Heat distortion | Mechanical properties | | |
| | | | | Flexural strength | Tensile strength $(kg/cm^2)$ | |
| | PEK | PEI | temperature (°C.) | 23° C. $(kg/cm^2)$ | 23° C. | 150° C. | Remarks |
| Comp. Ex. 1 | 100 | 0 | 167 | 1800 | 990 | 340 | |
| Comp. Ex. 2 | 98 | 2 | 166 | 1780 | 980 | 340 | |
| Ex. 1 | 90 | 10 | 169 | 1760 | 980 | 450 | |
| Ex. 2 | 80 | 20 | 165 | 1740 | 920 | 500 | |
| Ex. 3 | 70 | 30 | 165 | 1680 | 870 | 490 | |
| Ex. 4 | 60 | 40 | 167 | 1600 | 880 | 480 | |
| Comp. Ex. 3 | 50 | 50 | 167 | 1370 | 870 | 420 | Deformed upon release from mold |
| Comp. Ex. 4 | 40 | 60 | 168 | 1250 | 870 | 390 | |

EXAMPLES 5-7

A polyethersulfone solution was prepared, which consisted of 20 wt. % of "Victrex polyethersulfone PES 5003P" (trade name; product of Imperial Chemical Industries Limited), 40 wt. % of dichloromethane and 40 wt. % of 1,1,2-trichloroethane. Rovings of "HTA" (trade name for electrolytically surface-oxidized acrylic carbon fibers produced by TOHO RAYON CO. LTD.; the same carbon fibers were used in the subsequent examples and comparative examples unless otherwise specifically indicated) were continuously dipped at a travelling speed of 60 m/hr in the solution. After the rovings were dried to remove the solvents, they were chopped 3 mm by 3 mm into chopped strands.

The chopped strands were then put in a stainless steel vat and placed in an electric furnace which was heated at 370° C. In an air atmosphere, heat treatment was conducted for 10 hours.

The chopped carbon fiber strands obtained as described above were dry-blended with PEK and PEI, which were of the same type as their corresponding resins employed in Example 1, in the proportions shown in Table 2. The resultant blends were separately extruded at the extrusion temperature of 380° C. through an extruder having a cylinder diameter of 65 mm while being melted and kneaded, so that pellet samples, each having a uniform composition, were obtained.

The pellet samples were separately molded at a cylinder temperature of 380° C. and a mold temperature of 180° C. into ASTM No. 1 dumbbell specimens by means of an injection molding machine (mold locking force: 80 tons) manufactured by Nissei Plastic Industrial Co., Ltd. Their tensile tests and bending tests were conducted at room temperature (23° C.) and a high temperature (165° C.) in accordance with ASTM D-638 and D-790, respectively. The results are shown in Table 2.

COMPARATIVE EXAMPLE 5

Specimens of a carbon-fiber-incorporated PEK were prepared in a similar manner to Example 5 except that the PEK was only used as a matrix resin. The tensile strength and flexural strength of the specimens were measured similarly. The results are shown in Table 2.

COMPARATIVE EXAMPLE 6

Specimens of a carbon-fiber-incorporated PEI resin were prepared in a similar manner to Example 5 except that the PEI was only used as a matrix resin. The tensile strength and flexural strength of the specimens were measured similarly. The results are shown in Table 2.

COMPARATIVE EXAMPLE 7

Specimens of a carbon-fiber-incorporated PEI resin were prepared in a similar manner to Example 5 except that the mixing ratio of the PEK to the PEI was changed to 60:40. The tensile strength and flexural strength of the specimens were measured similarly. The results are shown in Table 2.

EXAMPLE 8

Specimens of a carbon-fiber-incorporated resin were prepared in a similar manner to Example 6 except that the proportion of carbon fibers was changed to 40 wt. %. The tensile strength and flexural strength of the specimens were measured similarly. The results are shown in Table 2.

COMPARATIVE EXAMPLES 8-9

Specimens of carbon-fiber-incorporated resins were prepared in a similar manner to Example 6 except that the proportion of carbon fibers was changed to 20 wt. % and 50 wt. %, respectively. The tensile strength and flexural strength of the specimens were measured similarly. The results are shown in Table 2.

TABLE 2

| | Evaluation of Fiber-Reinforced Resin Compositions | | | | | | | |
|---|---|---|---|---|---|---|---|---|
| | Charged composition (wt. %) | | | Mechanical properties | | | | |
| | Blending ratio in matrix resin | | Proportion of incorporated carbon fibers based on composition | Tensile strength (kg/mm$^2$) | | Flexural modulus (kg/mm$^2$) | | |
| | PEK (wt. %) | PEI (wt. %) | (wt. %) | 23° C. | 165° C. | 23° C. | 165° C. | Remarks |
| Comp. Ex. 5 | 100 | 0 | 30 | 28.5 | 14.0 | 2080 | 1190 | |
| Example 5 | 95 | 5 | 30 | 31.5 | 16.0 | 2550 | 2000 | |
| Example 6 | 80 | 20 | 30 | 33.4 | 17.5 | 2660 | 2190 | |
| Example 7 | 70 | 30 | 30 | 31.6 | 16.9 | 2460 | 1990 | |
| Example 8 | 80 | 20 | 40 | — | 20.0 | — | 2570 | |
| Comp. Ex. 6 | 0 | 100 | 30 | 28.9 | 14.0 | 2480 | 1950 | |
| Comp. Ex. 7 | 60 | 40 | 30 | 30.4 | 16.2 | 2270 | 1660 | |
| Comp. Ex. 8 | 80 | 20 | 20 | — | 13.5 | — | 1800 | |
| Comp. Ex. 9 | 80 | 20 | 50 | — | — | — | — | Molding was infeasible. |

Impeller Resin Composition Production Example 1

Following the procedure of Examples 5-7, polyacrylonitrile carbon fibers which had been subjected to surface treatment by electrolytic oxidation were surface-coated with the same aromatic polysulfone resin. They were chopped 6 mm by 6 mm into chopped carbon fibers, followed by heat treatment at 370° C. for 10 hours in a heat treatment furnace whose atmosphere was air.

Figure 4A:
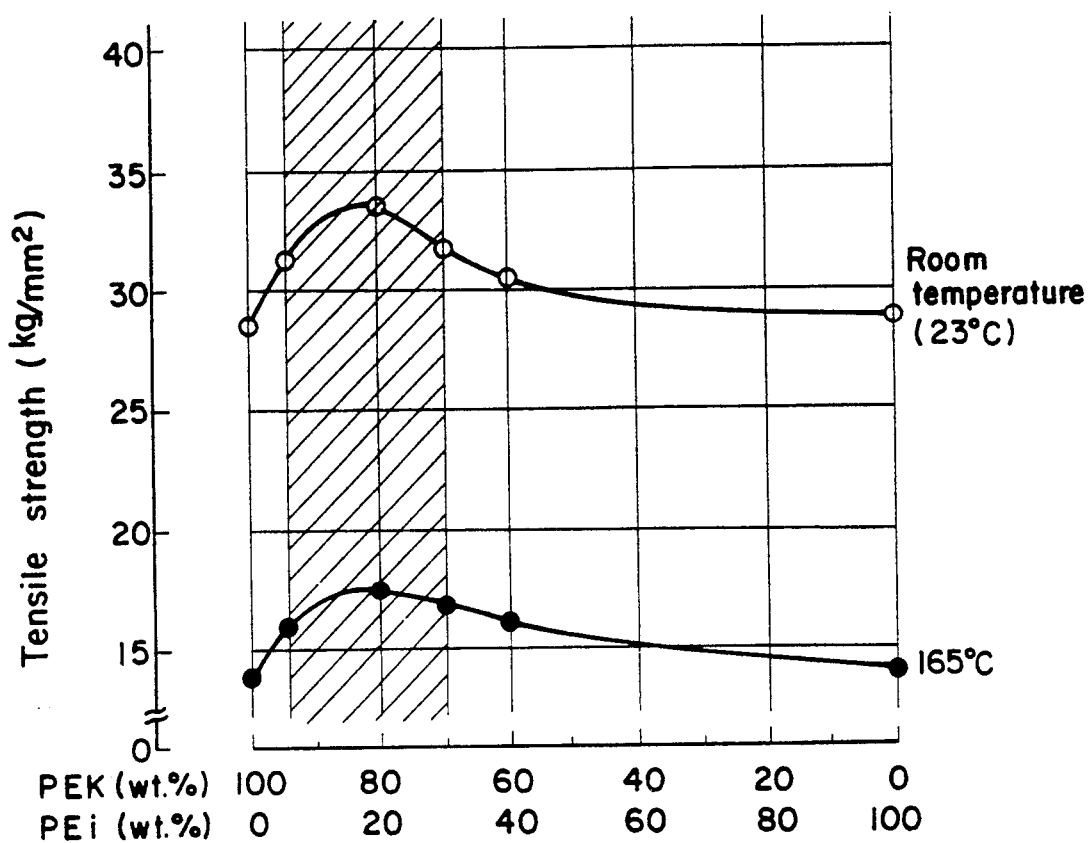
FIGS. 4(a) and 4(b) diagrammatically illustrate evaluation results in Production Example 1.
Figure 4B:
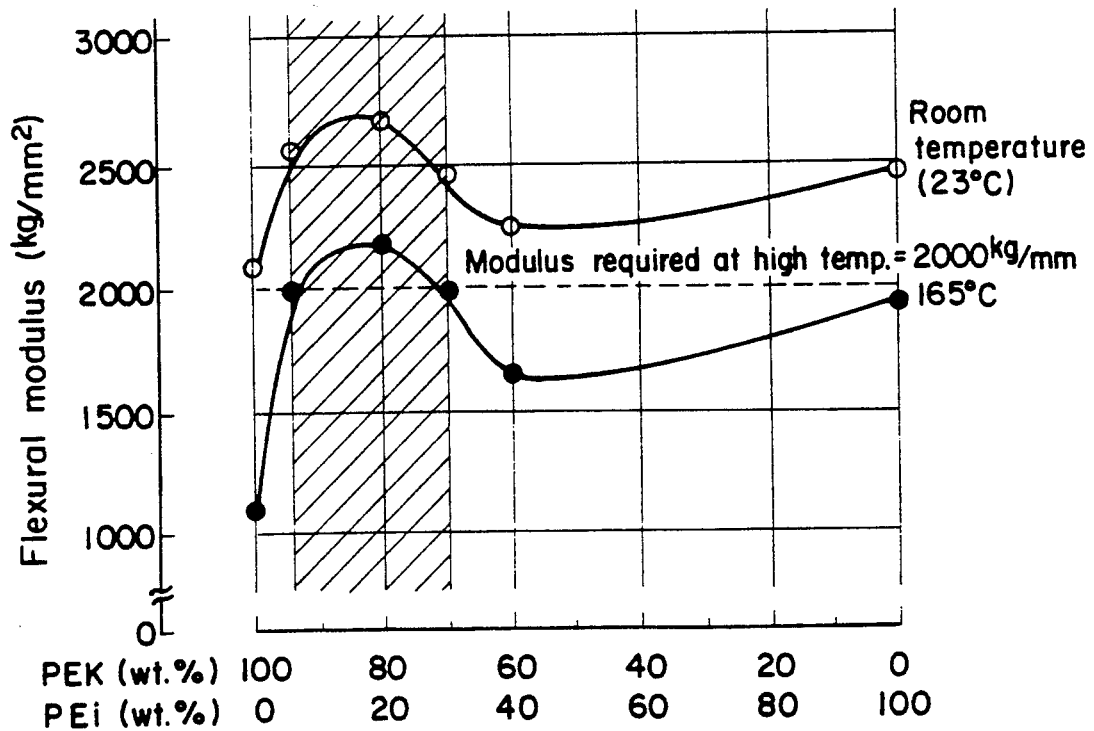

Table 3 shows blending ratios of polymer alloys as matrix resins, which consisted of "Victrex polyetherketone PEK 220P" and a polyetherimide resin (PEI produced by General Electric Company). The matrix resins of the respective blending ratios were separately mixed with the above-treated carbon fibers to give a carbon fiber content of 30 wt. %. The resultant mixtures were separately extruded as strands at a cylinder temperature of 380° C. and a screw revolution speed of 45 rpm through a vented single-screw extruder having a L/D ratio of 23 and the compression ratio of 3, followed by chopping. Pellet-like molding materials were, thus obtained. After the pellet-like molding materials were dried at 150° C. for 5 hours in hot air, they were separately molded at a cylinder temperature of 380° C. and a mold temperature of 180° C. into ASTM No. 1 dumbbell specimens 3 mm thick by using the injection molding machine (mold locking force: 80 tons) manufactured by Nissei Plastic Industrial Co., Ltd. Those specimens were heat treated at 23020 C. for 3 hours, and their tensile tests (ASTM D-638) and bending tests (ASTM D-790) were conducted at room temperature and a high temperature (165° C.). The results are tabulated along with their glass transition temperatures in Table 3 and are also plotted in FIGS. 4(a) and 4(b). In view of the correlation between the blending ratio of the polyetherketone and the polyetherimide and the tensile strength and flexural modulus, the particularly preferred blending ratio of the polyetherketone resin to the sum of both matrix resins is 70–95 wt. %.

TABLE 3

| Blending Ratio of Resins and Various Properties | | | | | | |
|---|---|---|---|---|---|---|
| | Blending ratio of PEK/PEI | | | | | |
| | 100/0 | 95/5 | 80/20 | 70/30 | 60/40 | 0/100 |
| Tg (°C.) | 160 | 170 | 183 | 184 | 187 | 217 |
| Tensile strength (kg/mm²) | | | | | | |
| Room temperature (23° C.) | 28.3 | 31.5 | 33.4 | 31.6 | 30.4 | 28.9 |
| 165° C. | 14.0 | 16.0 | 17.6 | 16.9 | 16.2 | 14.0 |
| Flexural modulus (kg/mm²) | | | | | | |
| Room temperature (23° C.) | 2080 | 2550 | 2660 | 2458 | 2269 | 2482 |
| 165° C. | 1197 | 2000 | 2195 | 1995 | 1662 | 1955 |

Note)
The carbon fiber content was 30 wt. % in all the compositions.

Impeller Resin Composition Production Example 2

Figure 5A:
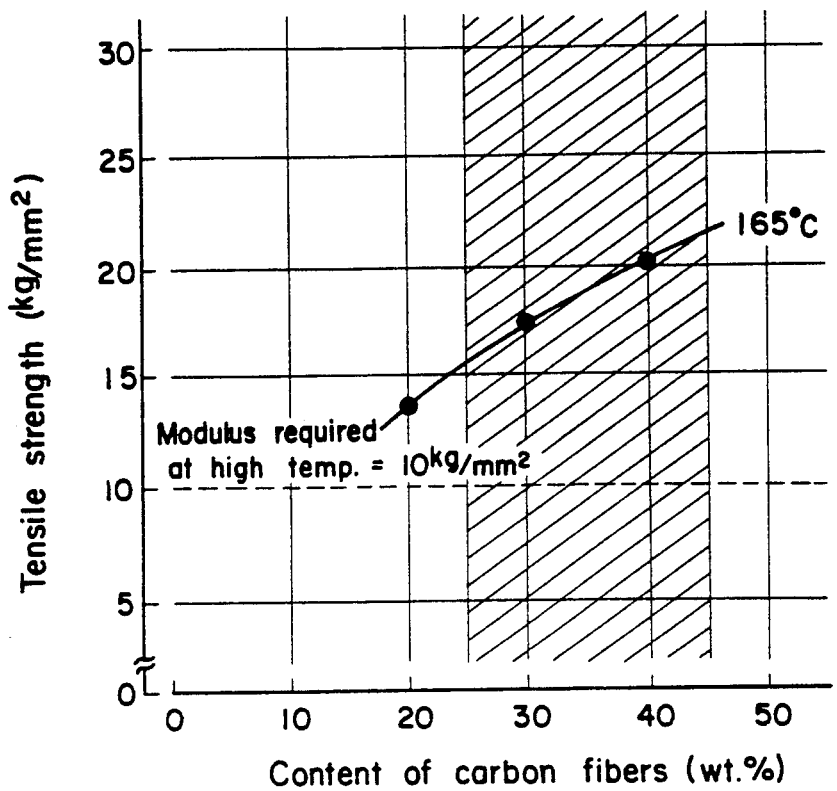
FIGS. 5(a) and 5(b) diagrammatically show evaluation results in Production Example 2.
Figure 5B:
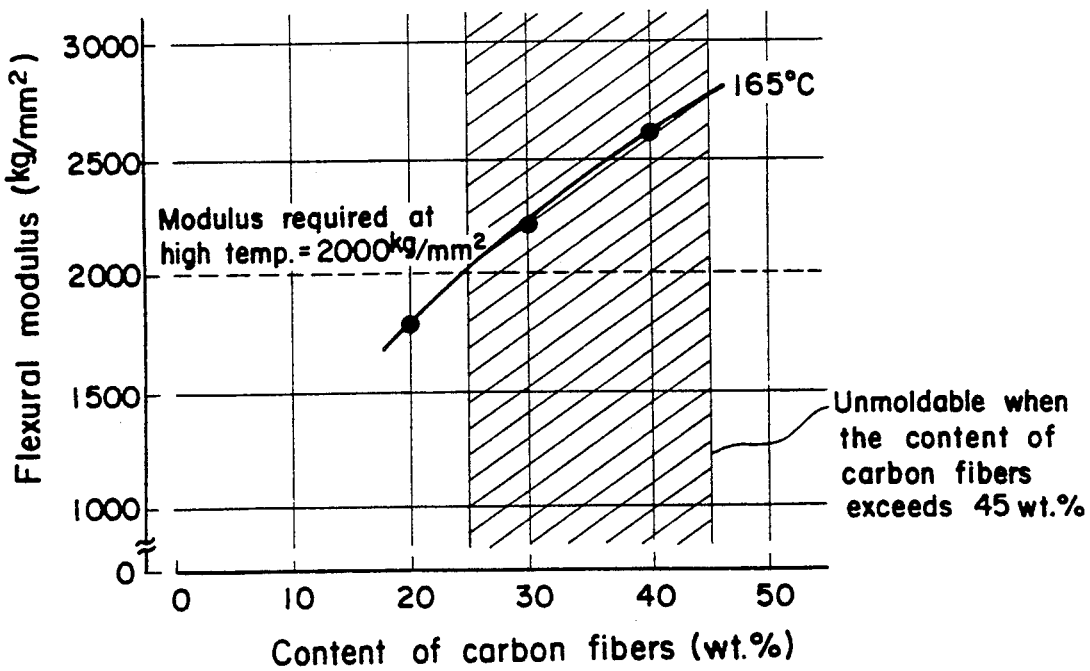

Under similar mixing and kneading conditions to Production Example 1, pellet-like resin compositions were produced by mixing and kneading a polymer alloy resin and carbon fibers to give carbon fiber contents of 20 wt. %, 30 wt. %, 40 wt. % and 50 wt. %, respectively. The polymer alloy resin was an 80/20 blend of "Victrex polyetherketone PEK 220P" and the polyetherimide resin (PEI produced by General Electric Company). The carbon fibers had been treated in a similar manner to Production Example 1. After the resin compositions were dried at 180° C. for 3 hours in hot air; they were separately molded at a cylinder temperature of 390° C. and a mold temperature of 190° C. into ASTM No. 1 dumbbell specimens 3 mm thick by using the injection molding machine (mold locking force: 80 tons) manufactured by Nissei Plastic Industrial Co., Ltd. Those specimens were heat treated at 230° C. for 3 hours, and their tensile tests and bending tests were conducted at a high temperature (165° C.). The results are plotted in FIGS. 5(a) and 5(b). As is readily understood from FIGS. 5(a) and 5(b), the optimum carbon fiber content falls within a range of 25–45 wt. %.

EXAMPLES 9–11

Pellet-like fiber-reinforced resin samples having the compositions given in Table 4 were produced in accordance with the procedure of Production Example 1. They were separately injected at a cylinder temperature of 390° C., a mold temperature of 180° C. and a injection pressure of 2100 kg/cm² into a mold having a similar structure to that shown in FIG. 3, whereby impeller-like molded products were obtained. The thus-obtained molded products were heat treated at 230° C. for 3 hours and were then subjected to machining such as deburring and balance checking. Each of the molded products was fixed on a shaft to make an assembly shown in FIG. 2. The assembly was then set on a high-speed rotary strength testing machine (revolution speed: 0–25×10⁴ rpm) which was equipped with an air heater (temperature range: 0°–600° C.). The assembly was subjected to a continuous durability test while controlling the testing machine to maintain the temperature of the impeller-compressed air at 165° C. at the outlet of the testing machine when the revolution speed was 13×10⁴ rpm. The results are shown in Table 4. The impellers which successfully withstood the continuous 200-hr durability test are rated to be good (shown by letter A).

EXAMPLE 12

Fiber-reinforced resin pellets having the composition position (carbon fiber content: 40 wt. %) shown in Table 4 were produced in accordance with the procedure of Production Example 1. Using those pellets, impeller-like molded products were prepared and tested in a similar manner to Example 9. The results are shown in Table 4.

COMPARATIVE EXAMPLES 10–12

In a similar manner to Examples 9–11 except for the use of pellet-like fiber-reinforced resin samples of the compositions shown in Table 4, impeller-like molded products were prepared and tested. The results are shown in Table 4.

COMPARATIVE EXAMPLES 13–14

In a similar manner to Examples 12 except for the use of pellet-like fiber-reinforced resin samples of the compositions (carbon fiber content: 20 wt. % and 50 wt. %) shown in Table 4, impeller-like molded products were prepared and tested. The results are shown in Table 4.

It is understood from the results of Table 4 that the impellers molded in the examples are superior in heat resistance and creep resistance to those of the comparative examples.

TABLE 4

| | Rating of Impellers | | | |
|---|---|---|---|---|
| | Charged composition (wt. %) | | | |
| | Blending ratio in matrix resin | | Proportion of incorporated carbon fibers based on composition | Results of durability test of impeller |
| | PEK (wt. %) | PEI (wt. %) | (wt. %) | |
| Example 9 | 80 | 20 | 30 | A (Not broken in 200 hr) |
| Example 10 | 95 | 5 | 30 | A (Not broken in 200 hr) |
| Example 11 | 70 | 30 | 30 | A (Not broken in 200 hr) |
| Example 12 | 80 | 20 | 40 | A (Not broken in 200 hr) |

TABLE 4-continued

Rating of Impellers

| | Charged composition (wt. %) | | Proportion of incorporated carbon fibers based on composition (wt. %) | Results of durability test of impeller |
|---|---|---|---|---|
| | Blending ratio in matrix resin | | | |
| | PEK (wt. %) | PEI (wt. %) | | |
| Comp. Ex. 10 | 100 | 0 | 30 | B (Broken in 200 hr) |
| Comp. Ex. 11 | 60 | 40 | 30 | B (Broken in 50 hr) |
| Comp. Ex. 12 | 0 | 100 | 30 | B (Broken in 10 hr) |
| Comp. Ex. 13 | 80 | 20 | 20 | B (Broken in 1 hr) |
| Comp. Ex. 14 | 80 | 20 | 46–50 | Molding was infeasible. |

We claim:

1. A fiber-reinforced aromatic polyetherketone resin composition comprising:

(a) 75–55 wt. % of a resin composition comprising: 95–70 wt. % of an aromatic polyetherketone having recurring units represented by the following formula (1):

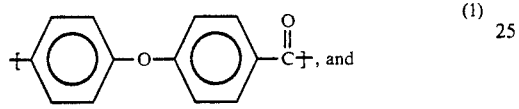

5–30 wt. % of a polyetherimide having recurring units represented by the following formula (2):

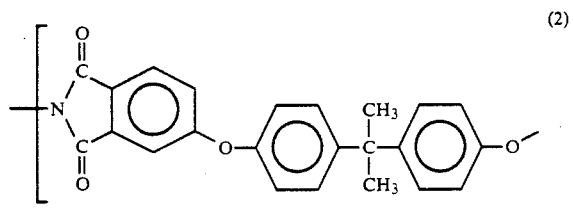

-continued

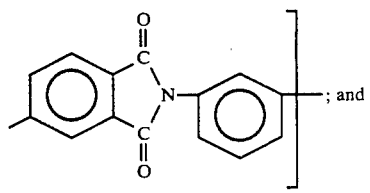

; and (b) 25–45 wt. % of carbon fibers obtained by coating starting carbon fibers at surfaces thereof with an aromatic polysulfone resin and then heating the thus-coated carbon fibers at 300°–400° C. for 3 to 20 hrs.

2. The composition of claim 1, wherein the aromatic polyetherketone has a melt flow index in a range of 5–50 g/10 min as measured at 380° C. under a load of 2.16 kg.

3. The composition of claim 1, wherein the polyetherimide has a melt flow index in a range of 0.3–5 g/10 min as measured at 320° C. under a load of 2.16 kg.

4. The composition of claim 1, wherein the aromatic polysulfone resin is selected from the group consisting of aromatic polysulfone resins having the following recurring units, respectively:

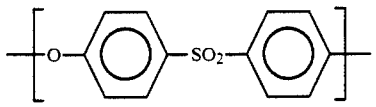

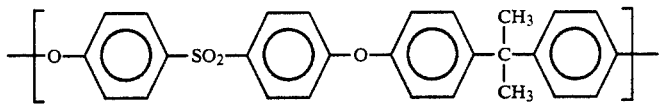

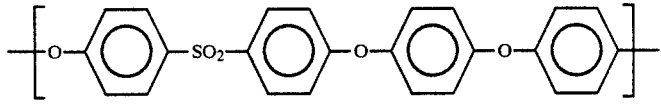

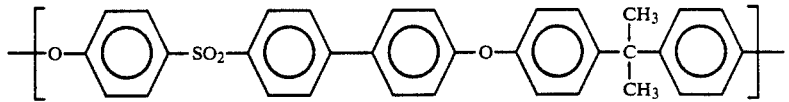

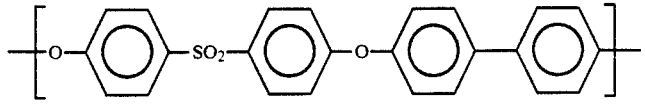

-continued

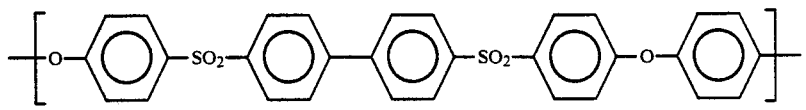

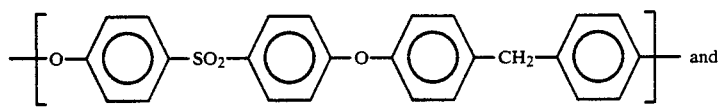 and

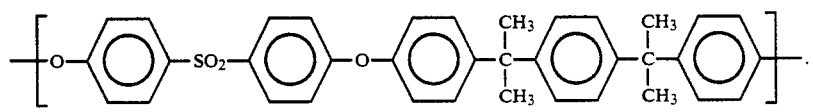

5. The composition of claim 1, wherein the carbon fibers have been obtained by coating the starting carbon fibers with 0.1-10 parts by weight of the aromatic polysulfone resin per 100 parts by weight of the starting carbon fibers.

6. A mechanical component for an internal combustion engine or auxiliary equipment, said mechanical component being formed of a fiber-reinforced resin composition which comprises:
(a) 75-55 wt. % of a resin composition comprising: 95-70 wt. % of an aromatic polyetherketone having recurring units represented by the following formula (1):

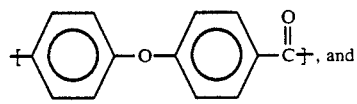

5-30 wt. % of a polyetherimide having recurring units represented by the following formula (2):

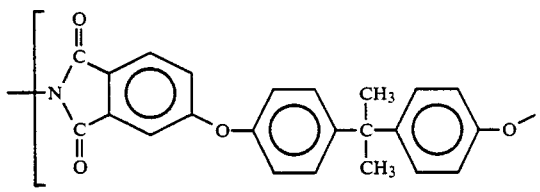

-continued

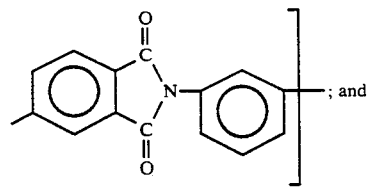; and (b) 25-45 wt. % of carbon fibers obtained by coating starting carbon fibers at surfaces thereof with an aromatic polysulfone resin and then heating the thus-coated carbon fibers at 300°-400° C. for 3 to 20 hours.

7. The mechanical component of claim 6, wherein the aromatic polyetherketone has a melt flow index in a range of 5-50 g/10 min as measured at 380° C. under a load of 2.16 kg.

8. The mechanical component of claim 6, wherein the polyetherimide has a melt flow index in a range of 0.3-5 g/10 min as measured at 320° C. under a load of 2.16 kg.

9. The mechanical component of claim 6, wherein the aromatic polysulfone resin is selected from the group consisting of aromatic polysulfone resins having the following recurring units, respectively:

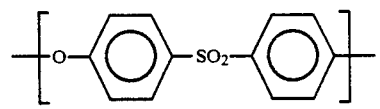

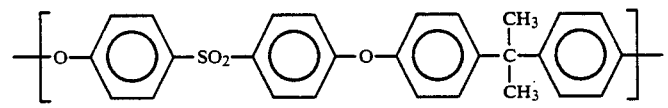

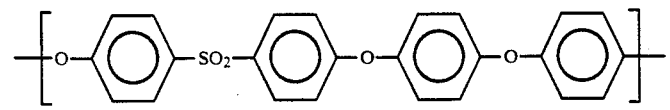

-continued
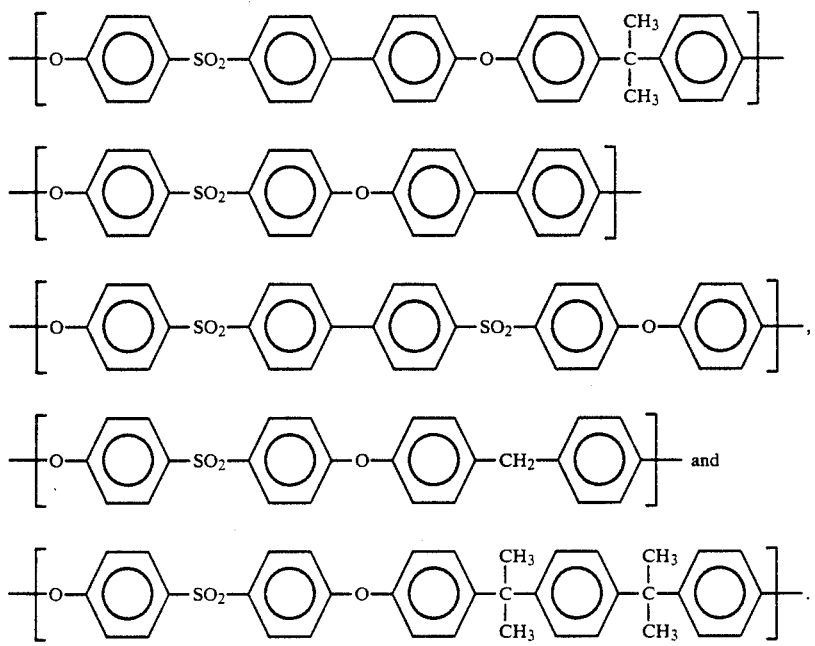
10. The mechanical component of claim 6, wherein the carbon fibers have been obtained by coating the starting carbon fibers with 0.1–10 parts by weight of the aromatic polysulfone resin per 100 parts by weight of the starting carbon fibers.
* * * * *